United States Patent
Suggs et al.

(10) Patent No.: US 6,344,512 B1
(45) Date of Patent: Feb. 5, 2002

(54) LATEX ELASTOMER BASED OIL SEALS AND PROCESS THEREOF

(75) Inventors: Steven M. Suggs; Steven Kristopher Kolb; Robert Gary Humphries, all of Nacogdoches, TX (US)

(73) Assignee: J. M. Clipper, Inc., Nacogdoches, TX (US)

( * ) Notice: Subject to any disclaimer, the term of this patent is extended or adjusted under 35 U.S.C. 154(b) by 0 days.

(21) Appl. No.: 09/620,761

(22) Filed: Jul. 21, 2000

(51) Int. Cl.[7] .................................................. C08K 3/18
(52) U.S. Cl. ....................................... 524/430; 524/496
(58) Field of Search .......................................... 524/430

(56) References Cited

U.S. PATENT DOCUMENTS

| | | | |
|---|---|---|---|
| 3,853,798 A | 12/1974 | Oelsner et al. | |
| 4,306,729 A | 12/1981 | Hiramatsu et al. | |
| 4,579,353 A | 4/1986 | Bower | |
| 4,588,780 A | * 5/1986 | Edwards | 525/184 |
| 5,049,289 A | 9/1991 | Jacobs | |
| 5,180,631 A | * 1/1993 | Amano | 428/236 |
| 5,272,198 A | * 12/1993 | Kaminski | 524/426 |
| 5,316,317 A | 5/1994 | Fedorovich et al. | |
| 5,360,851 A | 11/1994 | Feder et al. | |
| 5,472,995 A | * 12/1995 | Kaminski | 523/155 |
| 5,534,610 A | 7/1996 | Bayly et al. | |
| 5,683,819 A | * 11/1997 | Mori | 428/500 |
| 5,735,530 A | 4/1998 | Merkin et al. | |
| 5,849,404 A | * 12/1998 | Amano | 428/295.1 |
| 6,024,362 A | 2/2000 | Fedorovich | |
| 6,048,923 A | 4/2000 | Mabry et al. | |

* cited by examiner

*Primary Examiner*—Paul R. Michl
(74) *Attorney, Agent, or Firm*—Mayer, Brown & Platt

(57) ABSTRACT

A heel stock portion of an oil seal may be made of latex elastomer based compounds instead of volatile organic compounds. One embodiment of a latex elastomer based compound may comprise approximately 5–35% aramid fiber, approximately 10–20% metal oxide, approximately 10–60% carbon filler, approximately 1–5% curative, approximately 20–50% latex flouroelastomer, and approximately 10–50% mineral filler by weight based on the weight of the heel stock part of an oil seal. Another embodiment of a latex elastomer based compound may comprise approximately 10–40% aramid fiber, approximately 2–10% mineral fiber, approximately 2–10% carbon filler, approximately 20–40% mineral filler, approximately 2–10% metal oxide, approximately 5–20% glass fiber, approximately 1–5% curative accelerator, approximately 1–5% curative, approximately 1–5% anti-oxidant, approximately 10–40% latex nitrile elastomer, and approximately 1–5% polyester fiber by weight based on the weight of the heel stock part of an oil seal.

34 Claims, 4 Drawing Sheets

LATEX ELASTOMER BASED OIL SEALS AND PROCESS THEREOF

BACKGROUND

1. Field of the Invention

The present invention relates to latex elastomer based compounds, a process of making latex elastomer based compounds, latex elastomer based oil seals, and a process for making latex elastomer based oil seals using latex elastomer based compound. Particularly, the present invention is directed to latex elastomer based oil seals and process thereof that do not use volatile organic compounds.

2. Related Art

Oil seals prevent lubricants or other contaminants from traveling into and from a housing or structure. Oil seals are used in a wide range of equipment from pumps, motors, gear boxes, construction, mining machinery, and industry equipment. In fact, oil seals are used in plants in virtually every industry such as metals, pulp and paper, chemicals and picture chemical, power generation and more. An oil seal structure with lip and heel stock provide sealing between a shaft and housing or other structures. Oil seals are generally used with pumps, motors, gearboxes, and other devices utilizing rotating shafts. However, uses for oil seals are not limited to devices utilizing rotating shaft; oil seals can be used with any apparatus with a shaft and housing where isolation of the interior and exterior of this housing is desired.

A variety of oil seals and methods of making oil seals are known. Although such conventional methods and systems generally have been considered satisfactory for their intended purpose, conventional oil seals are often made with volatile organic compounds which have several disadvantages.

One of the disadvantages of making oil seals with volatile organic compounds is the waste of materials and excess cost associated with curing. When making oil seals with volatile organic compounds, curing is often necessary or helpful. However, the curing step creates waste and unusable material by exposing material to extreme heat and pressure. Curing particularly create waste when endscrap material is exposed to extreme heat and pressure and allowed to partially cure. Endscrap is excess material removed from a calendered compound that is partially cured and considered useless due to the irregular form and curative state. Endscrap that is subject to curing is not usable and must be trimmed from the edges and disposed of in a landfill. The cured endscrap which is unusable results in about an 8% or otherwise significant loss of material from which oil seals are made. Just like endscrap, preform scrap that is subject to curing is also unusable due to irreversible effects of heat aging. Preform scrap is material that is partially cured, removed from a rolling tube and considered useless due to the irregular form and curative state. Cured preform scrap must also be disposed of in a landfill. In a typical oil seal production facility, endscrap and preform scrap material account for several thousand pounds of unusable waste annually. The wasted unrecyclable endscrap and perform scrap translates to a loss of tens of thousands of dollars.

Besides the waste of material and excess cost, the curing step required with volatile organic compound has other disadvantages. Curing makes molding the lip and heel stock of the oil seal more difficult. Curing makes molding more difficult because volatile organic compound subjected to curing are less homogeneous and uniform. Making oil seals out of homogeneous uniform material is more cost effective than making oil seals out of cured volatile organic compounds which are not as uniform and homogeneous.

In addition to the waste of material, additional cost, and environmental concerns regarding diminishing landfill capacity, another disadvantage of making oil seals with volatile organic compounds are greater safety concerns. Additional safety precautions must be taken when handling, using, and storing volatile organic compounds due to the increased risks of fire, over-exposure, skin irritations, respiratory problems due to inhaling emissions and complying with various environmental regulations such as the Environmental Protection Agency.

Using volatile organic compounds to make oil seals is also inefficient in terms of time and equipment utilization. Volatile organic compound must be prepared and mixed in limited sizes and quantities. Volatile organic compound cannot be prepared in mass quantity.

There thus remains a need for safer and more cost efficient oil seals which retain the structural and performance benefits of conventional oil seals, but which do not use volatile organic compounds.

SUMMARY OF THE INVENTION

The invention relates to latex elastomer based compounds, a process of making latex elastomer based compounds, latex elastomer based oil seals, and a process of making oil seals using latex elastomer based compounds. The invention relates to a latex elastomer based compound comprising of aramid fiber, barium sulfate, magnesium oxide, carbon black filler, curative, latex flouroelastomer, mineral filler, and metal oxide and oil seals made of this latex elastomer based compound as well as a process of making such oil seals. The invention also relates to a latex elastomer based compound comprising of aramid fiber, mineral fiber, barium sulfate, mineral filler, glass fiber, carbon black filler, sulfur, curative accelerator, curative, antioxidant, latex nitrile elastomer, polyester fiber, and metal oxide and oil seals made of this latex elastomer based compound as well as a process of making such oil seals.

The invention also relates to a process of making latex elastomer based compounds comprising of providing ingredients for the latex elastomer based compound; combining the ingredients, rinsing the latex elastomer based compound; drying the latex elastomer based compound; masticating the latex elastomer based compound on a rubber mill; and calendering the latex elastomer based compound. The process may further comprise of plying the latex elastomer based compound. The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of latex elastomer based compounds, a process of making latex elastomer based compounds, latex elastomer based oil seal and a process for making oil seals using latex elastomer based compounds of the invention together with the description.

DETAILED DESCRIPTION OF THE PREFERRED EMBODIMENT

Figure 1:
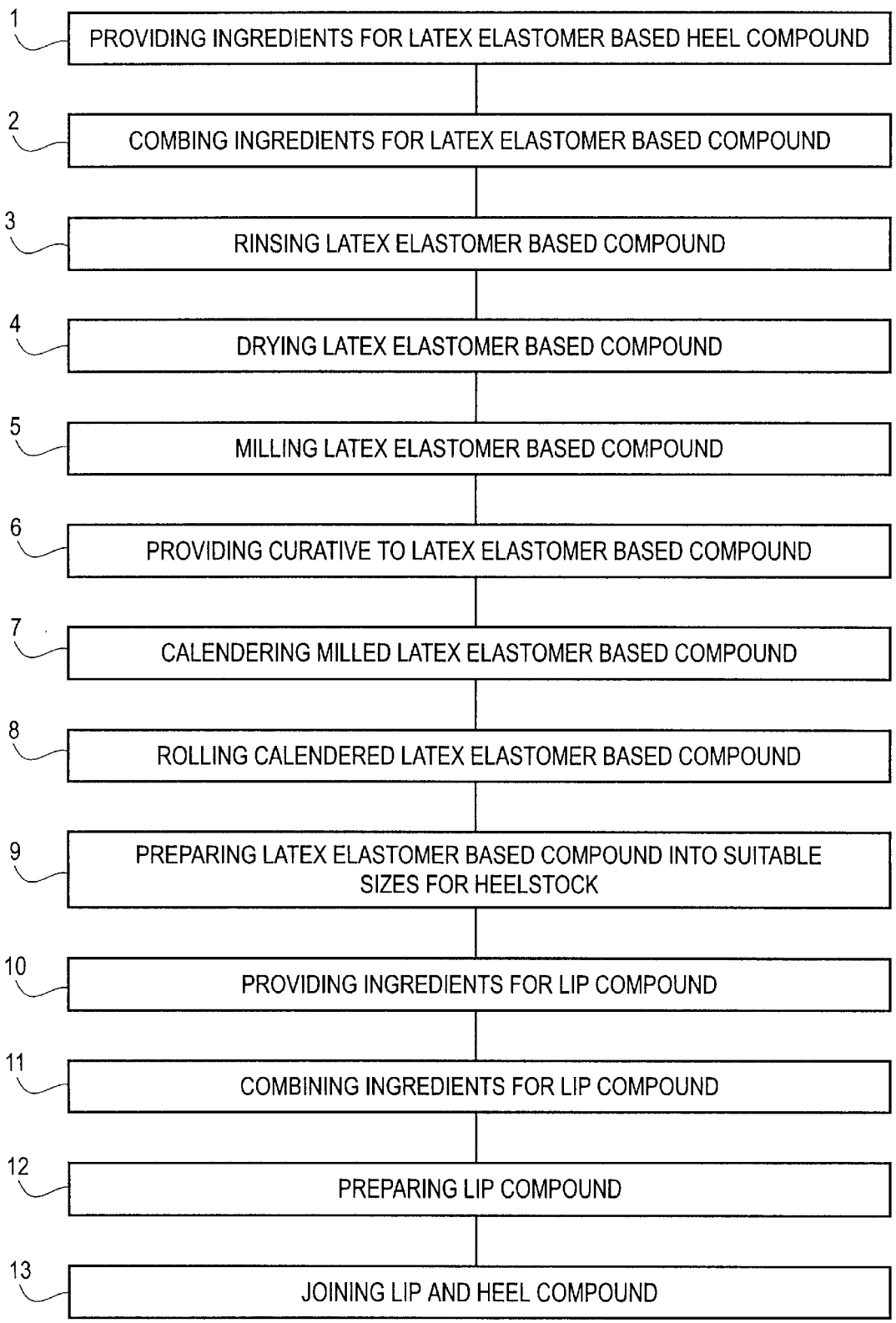
FIG. 1 is a schematic representation of a process for making latex based oil seals using a latex elastomer based compound in accordance with the invention.

Reference will now be made in detail to the present preferred embodiments of the invention, examples of which are illustrated in the accompanying drawings. The invention relates to latex elastomer based compounds, a process of making latex elastomer based compounds, oil seals made of latex elastomer based compounds, and a process of making such oil seals.

A latex elastomer based compound may be used to make the heel stock part of an oil seal. Latex elastomer based compounds may be made of various ingredients utilizing a latex elastomer suspended in a water base. One embodiment of the latex elastomer based compound is with latex flouroelastomer. The latex based flouroelastomer of the present invention generally includes aramid fiber, metal oxide, carbon filler, curative, latex flouroelastomer, and mineral filler. Aramid fiber may be known by trade name such as TWARON. The metal oxide may be any metal oxide that will react as an acid acceptor and curing component, such as Zinc oxide and magnesium oxide. Carbon filler may be known by trade name such as SRF BLACK. Curative may be known by trade name such as DIAK #3. Flouroelastomer may be known by trade name such as TECHNOFLON.

Table 1 lists a range of the ingredients for latex flouroelastomer based heel stock. Aramid fiber may be in a range of approximately 5–35%. Metal oxide may be in a range of approximately 10–20%. Carbon filler may be in a range of approximately 10–60%. Curative may be provided in an amount sufficient to reduce scorching. Specifically, curative may be in a range of approximately 1–5%. Latex flouroelastomer may be in a range of approximately 20–50%. Mineral filler may be in a range of approximately 10–50%. The percentage ranges are by weight based on the weight of the heel stock. Although the ingredients may be in the ranges as disclosed above, it is particularly advantageous to have the ingredients in the following range: Aramid fiber may be in a range of 8–10%. Metal oxide may be in a range of 12–14%. Carbon filler may be in a range of 15–20%. Curative may be in a range of 1–2%. Latex flourelastomer may be in a range of 29–31%. Mineral filler may be in a range of 24–28%. The percentage ranges are by weight based on the weight of the heel stock. As will be understood by those skilled in the art, the disclosed ingredients and ranges are for purposes of illustration and not limitation.

TABLE 1

Ingredients for Flouroelastomer-based Heelstock

| Examples of Ingredients | Examples of Trade Name | Possible Approximate Range | Preferred Range |
|---|---|---|---|
| Aramid Fiber | TWARON | 5–35% | 8–10% |
| Metal Oxide | MAGLITE Y | 10–20% | 12–14% |
| Carbon Filler | SRF BLACK | 10–60% | 15–20% |
| Curative | DIAK #3 | 1–5% | 1–2% |

TABLE 1-continued

Ingredients for Flouroelastomer-based Heelstock

| Examples of Ingredients | Examples of Trade Name | Possible Approximate Range | Preferred Range |
|---|---|---|---|
| Latex Flouroelastomer | TECHNOFLON | 20–50% | 29–31% |
| Mineral Filler | | 10–50% | 24–28% |

Another embodiment of a latex elastomer based compound is with latex nitrile elastomer. The latex nitrile elastomer generally includes aramid fiber, mineral fiber, mineral filler, glass fiber, carbon filler, metal oxide, curative accelerator, curative, anti-oxidant, latex nitrile elastomer, and polyester fiber. Aramid fiber may be known by trade name such as TWARON. Mineral fiber may be known by trade name such as GROUND SILICA. Mineral fillers may be known by trade name such as HI-SIL and BARYTES. Glass fiber may be known by trade name such as STAR-STRAN. Carbon filler may be known by trade name such as SRF BLACK. Curative accelerator may be known by trade name such as TMTD. Curative may be known by trade names such as CAPTAX or SULFUR. Anti-oxidant may be known by trade name such as STALITE. Polyester fiber may be known by trade name such as ¼ POLY. The metal oxide may be any metal oxide that will react as an acid acceptor and curing component, such as Zinc oxide or magnesium oxide. Latex nitrile elastomer may be known by trade name such as HYCAR LATEX.

Table 2 lists a range of the ingredients for a latex nitrile elastomer based heel stock. Aramid fiber may be in a range of approximately 10 to 40%. Mineral fiber may be in a range of approximately 2–10%. Mineral filler may be in a range of approximately 20–40%. Glass fiber may be in a range of approximately 5–20%. Carbon filler may be in a range of approximately 2–10%. Metal oxide may be in a range of approximately 2–10%. Accelerator curative may be in a range of approximately 1–5%. Curative may be provided in an amount sufficient to reduce scorching. Specifically, curative may be in a range of approximately 1–5%. Anti-oxidant may be in a range of 1–5%. Latex Nitrile elastomer may be in a range of approximately 10–40%. Polyester fiber may be in a range of approximately 1–5%. The percentage ranges are by weight based on the weight of the heel stock. As will be understood by those skilled in the art, the disclosed ingredients and ranges are for purposes of illustration, not limitation. The invention encompasses modification of the given ingredients and ranges. Although the ingredients may be in the ranges as disclosed above, it is particularly advantageous if the ingredients are combined in the following range: Aramid fiber may be in a range of 18–21%. Mineral fiber may be in a range of 3–5%. Mineral filler may be in a range of 30–35%. Glass fiber may be in a range of 9–11%. Carbon filler may be in a range of 2–4%. Metal oxide may be in a range of 2–4%. Accelerator curative may be in a range of 0.5–1%. Specifically, Curative may be in a range of 1–3%. Anti-oxidant may be in a range of 0.3–1%. Latex nitrate elastomer may be in a range of 22–26%. Polyester fiber may be in a range of 0.5–1.5%. The percentage ranges are by weight based on the weight of the heel stock. As will be understood by those skilled in the art, the disclosed ingredients and ranges are for purposes of illustration, not limitation. The invention encompasses modification of the given ingredients and ranges.

TABLE 2

Ingredients for Nitrile-based Heelstock

| Examples of Ingredient | Examples of Trade Name | Possible Approximate Range | Preferred Range |
|---|---|---|---|
| Aramid Fiber | TWARON | 10–40% | 18–21% |
| Mineral Fiber | GROUND SILICA | 2–10% | 3–5% |
| Mineral Filler | HI-SIL and BARYTES | 20–40% | 30–35% |
| Glass Fiber | STAR-STRAN | 5–20% | 9–11% |
| Carbon Filler | SRF BLACK | 2–10% | 2–4% |
| Metal Oxide |  | 2–10% | 2–4% |
| Accelerator Curative | TMTD | 1–5% | .5–1% |
| Curative | CAPTAX and SULFUR | 1–5% | 1–3% |
| Anti-Oxidant | STALITE | 1–5% | .3–1% |
| Latex Nitrile Elastomer | HYCAR LATEX | 10–40% | 22–26% |
| Polyester Fiber | ¼" POLY | 1–5% | .5–1.5% |

The two disclosed embodiments of latex based compound are for purposes of illustration, not limitation. While the latex elastomer based compound of the present invention has been described using a flouroelastomer or nitrile elastomer, any other suitable latex elastomer may be used.

The invention also relates to a process of making latex elastomer based compounds. A latex elastomer based compound is prepared by first providing all the ingredients for the latex elastomer based compound. One embodiment of the ingredients, for purposes of illustration and not limitation, may include approximately 5–35% aramid fiber, approximately 10–50% mineral filler, approximately 10–60% carbon filler, approximately 10–20% metal oxide, and approximately 20–50% latex flouroelastomer by weight based on the weight of the heel stock. Curative may be provided in an amount sufficient to reduce scorching. Specifically, curative may be in a range of approximately 1–5%. It is particularly advantageous if the ingredients are in the following range: Aramid fiber may be in a range of 8–10%. Metal oxide may be in a range of 12–14%. Carbon filler may be in a range of 15–20%. Curative may be in a range of 1–2%. Latex flouroelastomer may be in a range of 29–31%. Mineral filler may be in a range of 24–28%. The percentage ranges are by weight based on the weight of the heel stock. As will be understood by those skilled in the art, the disclosed ingredients and ranges are for purposes of illustration, not limitation. The invention encompasses modification of the given ingredients and ranges.

Another embodiment of the ingredients, for purposes of illustration and not limitation, may include the following: Aramid fiber may be in a range of approximately 10 to 40%. Mineral fiber may be in a range of approximately 2–10%. Mineral filler may be in a range of approximately 20–40%. Glass fiber may be in a range of approximately 5–20%. Carbon black filler may be in a range of approximately 2–10%. Metal oxide may be in a range of approximately 2–10%. Accelerator curative may be in a range of approximately 1–5%. Curative may be provided in an amount sufficient to reduce scorching. Specifically, curative may be in a range of approximately 1–5%. Anti-oxidant may be in a range of approximately 1–5%. Latex Nitrile elastomer may be in a range of approximately 10–40%. Polyester fiber may be in a range of approximately 1–5%. The percentage ranges are by weight based on the weight of the heel stock. Although it is possible to make the compound with the ranges disclosed above, it is particularly advantageous if the ingredients are provided in the following range: Aramid fiber may be in a range of 18–21%. Mineral fiber may be in a range of 3–5%. Mineral filler may be in a range of 30–35%. Glass fiber may be in a range of 9–11%. Carbon filler may be in a range of 2–4%. Metal oxide may be in a range of 2–4%. Accelerator curative may be in a range of 0.5–1%. Curative may be in a range of 1–3%. Anti-oxidant may be in a range of 0.3–1%. Latex nitrile elastomer may be in a range of 22–26%. Polyester fiber may be in a range of 0.5–1.5%. The percentage ranges are by weight based on the weight of the heel stock. As will be understood by those skilled in the art, the disclosed ingredients and ranges are for purposes of illustration, not limitation. The invention encompasses modification of the given ingredients and ranges.

The next step in the process of making latex elastomer based compound is to combine the ingredients. The ingredients may be combined in a mixer. If using a mixer, it is best to use a high-shear mixer. An approximately 2–25% by weight amount of Methyl Ethyl Ketone (MEK) may be used to gel flouroelastomer. An approximately 2–25% by weight amount of Toluene may be used to gel nitrile elastomer. While combining, the elastomer breaks from the water suspension and attaches to the fiber and filler material. The latex elastomer based compound is next rinsed. The elastomer may be rinsed with water to remove soap residue from the emulsion process of elastomer production. The latex elastomer based compound is then dried. Next the dried latex elastomer based compound is masticated. The latex elastomer based compound may be masticated on a standard rubber mill. Masticating blends the ingredients in the latex elastomer based compound and makes the compound uniform and homogeneous. The latex elastomer based compound is then calendered. To manufacture standard oil seals, the latex elastomer based compound may be calendered to an approximate 0.031 " range. However, the compound may be calendered to any desired thickness not exceeding the width of the intended mold, depending on the application. As an optional step, the latex elastomer based compound may be plied or extruded to a suitable preform material for the heelstock part of the oil seal. The plying may be radial.

The two disclosed embodiments of latex elastomer based compound are for purposes of illustration, not limitation. While the process of making latex elastomer based compound has been described using a flouroelastomer or nitrile elastomer, any other suitable latex elastomer may be used to make latex elastomer based compounds.

The invention also relates to a process of making oil seals using latex elastomer based compound. FIG. 1 discloses a process of making oil seals using latex elastomer based compound. One embodiment of a process of making latex elastomer based oil seals comprises of the following steps: Ingredients for latex elastomer based heel compound are provided, 1 (FIG. 1). One embodiment of providing the ingredients for a latex elastomer based heel compound comprises the following: Aramid fiber may be in a range of approximately 5–35%. Metal oxide may be in a range of approximately 10–50%. Carbon filler may be in a range of approximately 10–60%. Latex flouroelastomer may be in a range of approximately 20–50%. Mineral filler may be in a range of approximately 10–50%. The percentage ranges are by weight based on the weight of the heel stock. Although the ingredients may be in the ranges as disclosed above, it is particularly advantageous to have the ingredients in the following range: Aramid fiber may be in a range of 8–10%. Metal oxide may be in a range of 24–28%. Carbon filler may be in a range of 15–20%. Latex flouroelastomer may be in a range of 29–31%. Mineral filler may be in a range of 24–28%. The percentage ranges are by weight based on the weight of the heel stock. As will be understood by those skilled in the art, the disclosed ingredients and ranges are for purposes of illustration, not limitation. The invention encompasses modification of the given ingredients and ranges.

Another embodiment of providing the ingredients for a latex elastomer based heel compound comprises the following: Aramid fiber may be in a range of approximately 10–40%. Mineral fiber may be in a range of approximately 2–10%. Mineral filler may be in a range of approximately 20–40%. Glass fiber may be in a range of approximately 5–20%. Carbon black filler may be in a range of approximately 2–10%. Metal oxide may be in a range of approximately 2–10%. Accelerator curative may be in a range of approximately 1–5%. Antioxidant may be in a range of approximately 1–5%. Latex Nitrile elastomer may be in a range of approximately 10–40%. Polyester fiber may be in a range of approximately 1–5%. The percentage ranges are by weight based on the weight of the heel stock. Although it is possible to make the compound with the ranges disclosed above, it is particularly advantageous if the ingredients are combined in the following range: Aramid fiber may be in a range of 18–21%. Mineral fiber may be in a range of 3–5%. Mineral fiber may be in a range of 3–5%. Mineral filler may be in a range of 30–35%. Glass fiber may be in a range of 9–11%. Carbon filler may be in a range of 2–4%. Metal oxide may be in a range of 2–4%. Accelerator curative may be in a range of 0.5–1%. Anti-oxidant may be in a range of 0.3–1%. Latex nitrate elastomer maybe in a range of 22–26%. Polyester fiber may be in a range of 0.5–1.5%. The percentage ranges are by weight based on the weight of the heel stock. As will be understood by those skilled in the art, the disclosed ingredients and ranges are for purposes of illustration, not limitation. The invention encompasses modification of the given ingredients and ranges.

The two disclosed embodiments of latex elastomer based compound are for purposes of illustration, not limitation. While the process of making oil seal using latex elastomer based compound has been described using a flouroelastomer or nitrile elastomer, any other suitable latex elastomer may be used to make oil seals.

The next step in the process of making oil seals using latex elastomer based compound is to combine the ingredients for the latex elastomer based compound, 2 (FIG. 1). The ingredients for latex elastomer based heel compound may be combined on a mixer, specifically a horizontal mixer. The latex elastomer based compound is rinsed, 3 (FIG. 1). The latex elastomer compound may be rinsed with water to reduce soap content. The latex elastomer based compound is then dried, 4 (FIG. 1). The latex elastomer compound may be dried by layering to achieve proper moisture content. The latex elastomer based compound is then milled, 5 (FIG. 1). Curative is provided, 6 (FIG. 1). Curative may be provided in an amount sufficient to reduce scorching. Specifically, curative may be in a range of approximately 1–5%. The milled latex elastomer based compound is calendered, 7 (FIG. 1). The milled latex elastomer based compound may be calendered to a uniform sheet, if desired. The calendered latex elastomer based compound is then rolled, 8 (FIG. 1). The elastomer may be rolled to any dimension. The latex elastomer based compound is then prepared into suitable sizes for heelstock, 9 (FIG. 1). The latex elastomer based compound may be prepared by cutting, tearing, or otherwise making into smaller pieces such as strips.

For the next step, ingredients for lip compound part of an oil seal are provided, 10 (FIG. 1). The ingredients for lip compound may be made of various materials. For purposes of illustration and not limitation, Table 3 lists a range of ingredients for one embodiment of a lip compound. The lip compound may comprise of the following ingredients: Nitrile Butadiene binder known by trade name such as PARACRIL CLT, Chloroprene binder known by the trade name such as NEOPRENE W, activators such as zinc oxide or stearic acid, anti-oxidant known by trade name such as AGERITE RESIN D, carbon fillers, Plasticizer known by trade name such as NATROCEL 6102 A and P-25 EZ MIX, and curatives known by trade names such as SULFUR A, TMTD and MBTS. One embodiment of providing the ingredients for a lip compound comprises the following range: approximately 25–45% nitrile butadiene binder, approximately 1–10% chloroprene binder, approximately 1–5% activator, approximately 1–5% anti-oxidant, approximately 38–52% carbon fillers, approximately 5–15% plasticizer, and approximately 1–5% curative. The percentage ranges are by weight based on the weight of the lip compound. As will be understood by those skilled in the art, the disclosed ingredients and ranges are for purposes of illustration, not limitation. The invention encompasses modification of the given ingredients and ranges.

TABLE 3

Ingredients for Lip Compound

| Examples of Ingredients | Examples of Trade Name | Approximate Possible Range |
|---|---|---|
| Nitrile Butadiene Binder | PARACRIL CLT | 25–45% |
| Chloroprene Binder | NEOPRENE W | 1–10% |
| Activator | | 1–5% |
| Anti-Oxidant | AGERITE RESIN D | 1–5% |
| Carbon Fillers | | 38–52% |
| Plasticizer | P-25 EZ MIX and NATROCEL 6102 A | 5–15% |
| Curative | TMTD, MBTS, SULFUR A | 1–5% |

For purposes of illustration not limitation, Table 4 lists a range of ingredients for another embodiment of a lip compound. The lip compound may comprise of the following ingredients: flouroelastomer binder known by trade name such as VITON B-401, metal oxide, calcium hydroxide, polytetrafluoroethylene known by trade name such as MPB-1500 and TEFLON, carbon fillers known by trade names such as N-990 CARBON BLACK, bisphenol known by trade name such as such as VITON CURATIVE #20 and VITON CURATIVE #50, and lubricant known by trade names such as CARNAUBA WAX. One embodiment of providing the ingredients for a lip compound comprises the following range: approximately 30–70% flouroelastomer binder, approximately 1–10% metal oxide, approximately 2–10% calcium hydroxide, approximately 1–10% polytetraflouroethylene, approximately 15–30% carbon filler, approximately 1–8% bisphenol, and approximately 1–5% lubricant. The percentage ranges are by weight based on the weight of the lip compound. As will be understood by those skilled in the art, the disclosed ingredients and ranges are for purposes of illustration, not limitation. The invention encompasses modification of the given ingredients and ranges.

TABLE 4

Ingredients for Lip Compound

| Examples of Ingredient | Examples of Trade Name | Approximate Possible Range |
| --- | --- | --- |
| Flouroelastomer Binder | VITON B-401 | 30–70% |
| Metal Oxide | | 1–10% |
| Ca(OH)$_2$ | CALCIUM HYDROXIDE | 2–10% |
| Polytetrafluoroethylene | MP-1500 and TEFLON | 1–10% |
| Carbon Filler | N-990 CARBON BLACK | 15–30% |
| Bisphenol | VITON CURATIVE #20 VITRON CURATIVE #50 | 1–8% |
| Lubricant | CARNAUBA WAX | 1–5% |

The two disclosed embodiments of the lip compound are for purposes of illustration, not limitation. While the lip compound has been described using the above ingredients, the invention encompasses a process of making latex elastomer based oil seals with any type of lip compound. The process of making oil seals with latex elastomer is suitable with any type of lip compound. Various other curatives, activators, fillers, lubricants or plasticizers may be used to make a lip compound.

The next step in the process of making a latex elastomer based oil seal is to combine the ingredients for lip compound, 11 (FIG. 1). The ingredients for the lip compound may be combined in mixer, specifically a vertical mixer. Lip compound is then prepared, 12 (FIG. 1). The lip compound may be prepared by slitting or otherwise cutting in any manner with any instrument. Lip and heel compound are then joined, 13 (FIG. 1). As an example, the lip and heel compound may be joined by molding. As an optional step, the heelstock and lip compound may be plied or extruded to a suitable preform material.

Figure 2:
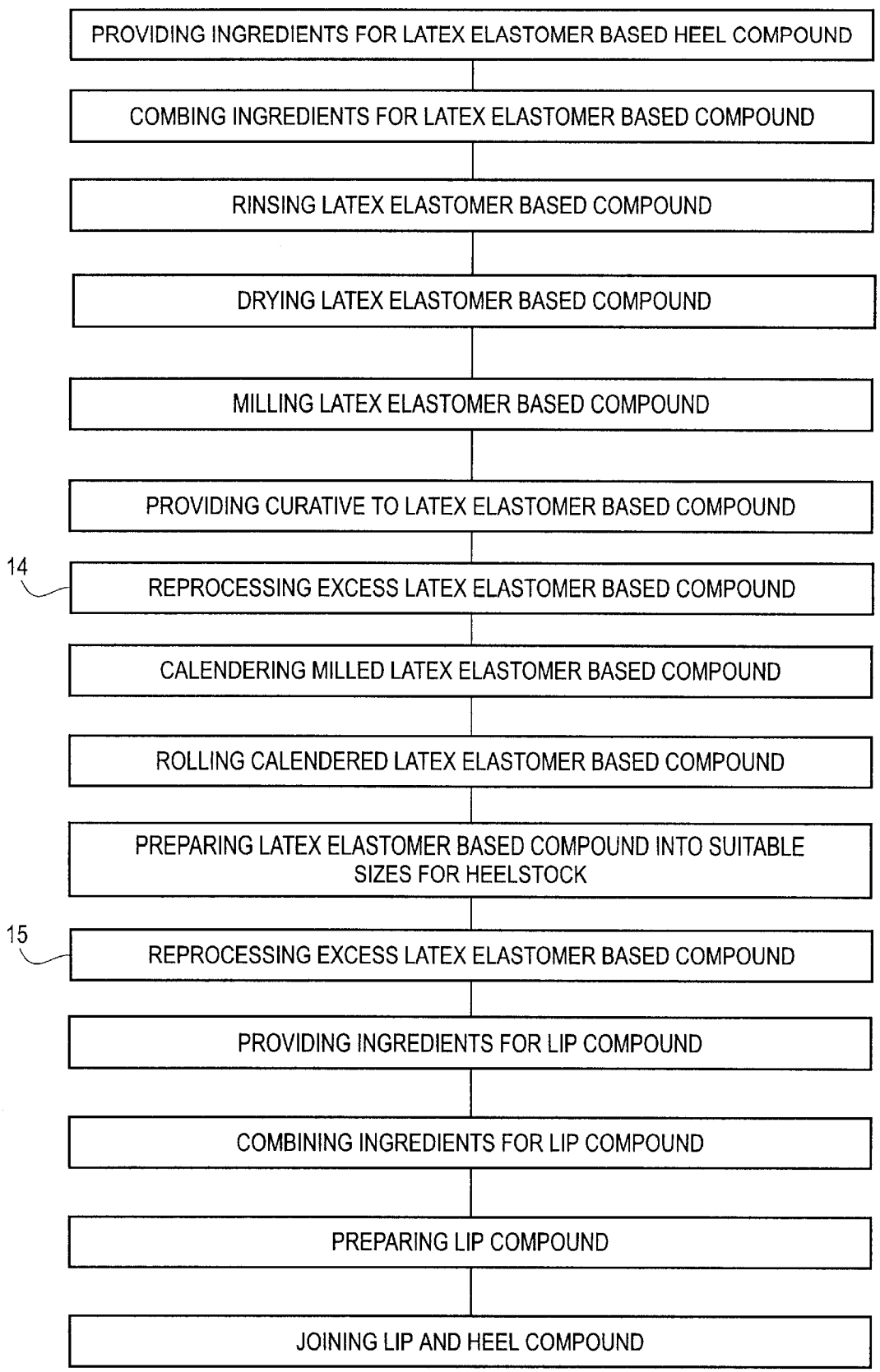
FIG. 2 is another schematic representation of a process for making latex based oil seals using a latex elastomer based compound in accordance with the invention.

Additional optional recycling steps in the process of making latex elastomer based oil seals is disclosed in FIG. 2. This process, as opposed to the previous process in FIG. 1, includes additional steps of reprocessing excess latex elastomer based compounds. This process of making latex elastomer based oil seals, as disclosed in FIG. 2, comprises of the following steps: ingredients for latex elastomer based heel compound; combining ingredients for latex elastomer based compound on a mixer; rinsing latex elastomer based to reduce silk content; drying latex elastomer based compound; milling latex elastomer based compound; providing curative to latex elastomer based compound; reprocessing excess latex elastomer based compound 14 (FIG. 2); calendering milled latex elastomer based compound to uniform sheet; rolling calendered latex elastomer based compound; preparing latex elastomer based compound into suitable sizes for heelstock; reprocessing excess latex elastomer based compound 15 (FIG. 2); providing ingredients for a lip compound on a mixer; preparing lip compound; and joining lip and heel compound.

As disclosed in FIGS. 1 and 2, latex elastomer based oil seals are made by providing curative during the milling process. Curative may be provided during or after the milling process to prevent or minimize scorching. However, curative may be provided during the combining step when all the other ingredients for latex elastomer based compound are combined.

Using latex elastomer based compounds instead of volatile organic compounds to make the heel stock of an oil seal has several advantages. One advantage is that unlike volatile organic compounds, which are cured, latex elastomer based compound is not cured nor partially cured before the molding process. Consequently, latex elastomer based compound is not exposed to extreme heat and temperature during the curing process. Latex elastomer based compound is not cured until it reaches the molding step. The absence of curing associated with latex elastomer based has many other advantages. For example, cured material cannot be reprocessed. Because latex elastomer based compound is not cured, the scrap that accumulates while making an oil seal can be reused unlike the scrap from volatile organic compounds. Consequently, loss of scrap can be eliminated or minimized by using a latex elastomer based heel stock. Reusing scrap also reduces landfill waste. Another advantage of not being cured is that latex elastomer based compound is much easier to mold than volatile organic compounds. Non cured latex elastomer based compounds flows and conforms to a mold design more easily than cured volatile organic compounds. Another advantage of latex elastomer based compound's non-cured state is a uniformly molded oil seal heel with no physical separation in plied material. Yet another advantage of latex elastomer based compound is that the heel and lip of the oil seal can be physically bonded without using a priming cement. Only a small amount of solvent is need to adhere plies, resulting in annual savings of several hundred thousand dollars on material and labor.

Another advantage of using latex elastomer based compounds instead of volatile organic compounds to make oil seals is that during the calendering process, the latex elastomer based compound is exposed to a highly pressured fiber aligning process. The fiber aligning process associated with latex elastomer based compound results in several advantages. For example, the fiber alignment process improves tensile properties as well as bore retention and firmness during low and elevated temperatures. Due to the uniform alignment of fiber, latex elastomer based compound also trims and finishes more smoothly than volatile organic compound. The fiber alignment process also improves chemical resistance due to the encapsulation of fiber by the elastomeric binder.

Another advantage of using latex elastomer based compound to make oil seal is saving of time. Latex elastomer based compounds may be combined or mixed in 500 lb batches unlike volatile organic solvents which are usually mixed in only 70 lb. batches. The amount of time saved is significant. Using latex elastomer based to make oil seals also improves equipment utilization by eliminating the consumption of one calender and utilizing time not used on the calender. Another advantage of latex elastomer based is its consistency in thickness and density, resulting in a more consistent finished oil seal heel. Longer lengths are obtainable using a continuous feed method rather than a mandrel calendering process.

Using latex elastomer based compound instead of volatile organic compound also promotes a healthier working environment and reduces hazards associated with the handling, using and storage of volatile solvents. For example, using latex elastomer based instead of volatile organic compound may help reduce total plant volatile emissions by 25–30%. Using latex elastomer based instead of volatile organic compound also reduces risks associated with fire, overexposure, skin irritations, respiratory problems, emission limitations and EPA regulations.

Figure 3:
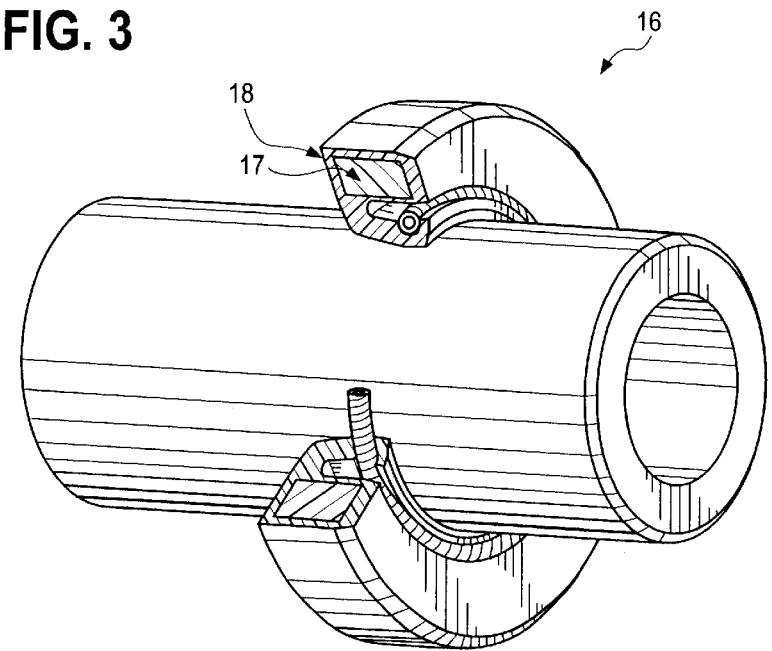
FIG. 3 is a perspective view of a latex elastomer based oil seal.
Figure 4:
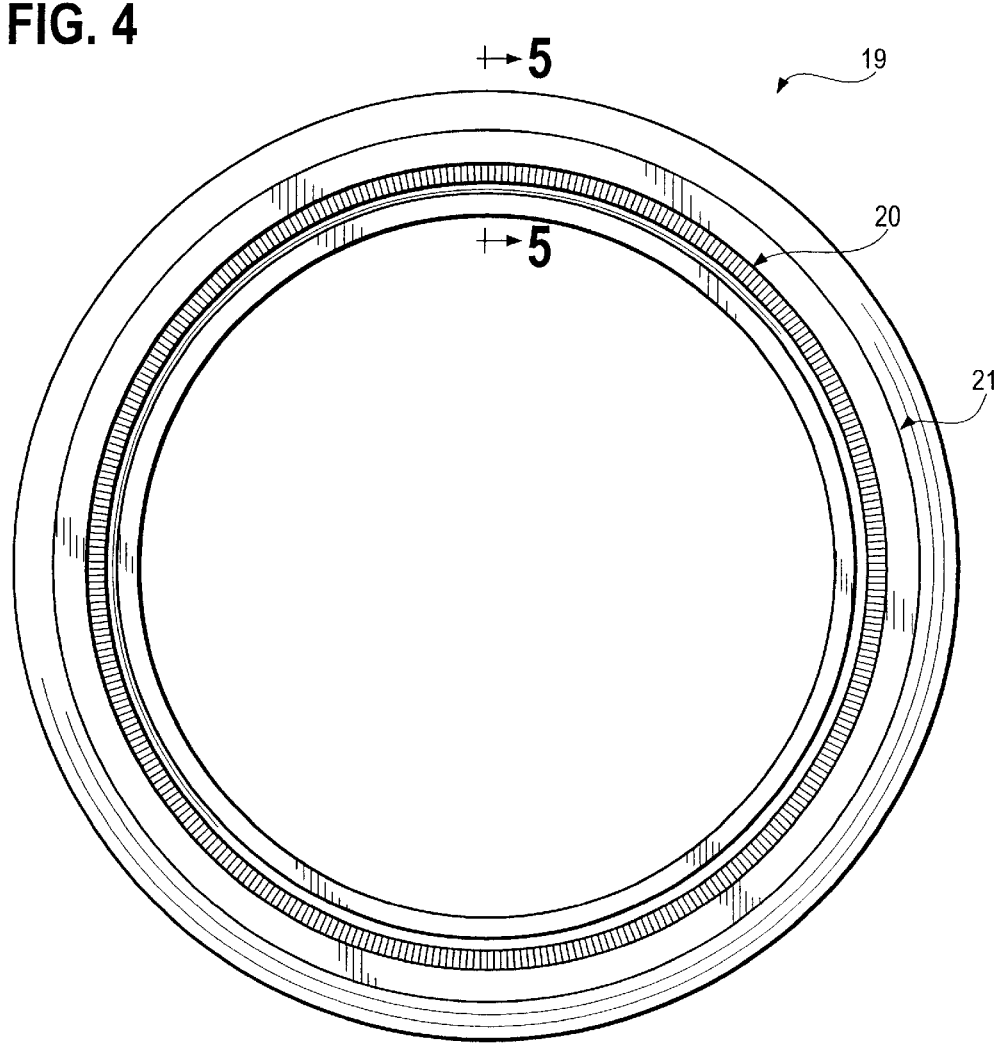
FIG. 4 is an elevation view of a latex elastomer based oil seal.
Figure 5:
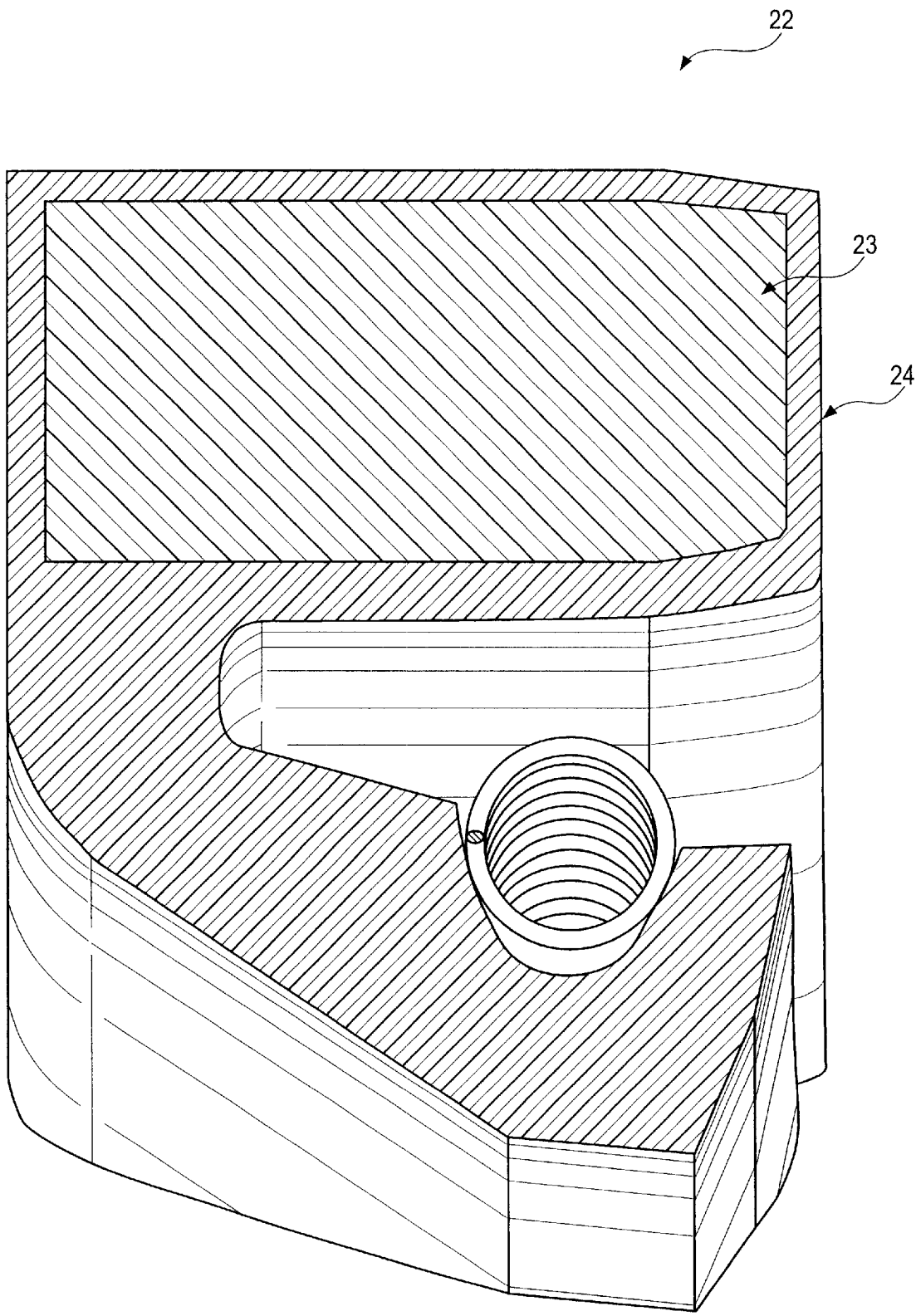
FIG. 5 is an enlarged cross section view of a latex elastomer based oil seal.

The invention also relates to latex elastomer based oil seals. An oil seal has 2 parts, lip and heel, which are molded together. The lip part of the oil seal surrounds the heel all the way around much like a coating. Oil seals may be made of a variety of materials to prevent lubricants or other contaminants from traveling into and from a housing or structure. 16 FIG. 3 is a perspective view of an oil seal. 19 FIG. 4 is an elevation view of a latex elastomer based oil seal. 22 FIG. 5 is an enlarged cross section view of a latex elastomer based oil seal. FIGS. 3, 4 and 5 are for purposes of illustration, not limitation. The latex elastomer based heel as seen in 17 FIG. 3, is surrounded by the lip, 18 FIG. 3. The latex elastomer based heel as seen in 20 FIG. 4, is surrounded by the lip, 21 FIG. 4. The enlarged cross section view in FIG. 5 highlights the difference between the latex elastomer based heel, 23 FIG. 5, and the lip, 24 FIG. 5. The latex elastomer based heel, 23 FIG. 5, and the lip, 24 FIG. 5, may be of any size, width, and of varying composition. In fact, latex elastomer based heels of different width, sizes, and compositions may be surrounded by lips of different width, size, and compositions to make oil seals of various sizes, width, and compositions for various purposes. Furthermore, the latex elastomer based heel may be made of various elastomers.

The latex elastomer based compounds presented herein may be used to make the heel of an oil seal as disclosed in 17 FIG. 3 and 23 FIG. 5. However, a latex based elastomer heel of an oil seal may be made of various other elastomers as well. One embodiment, for purposes of illustration and not limitation, of a latex elastomer based heel as disclosed in 17 FIG. 3 and 23 FIG. 5, comprises of aramid fiber, mineral filler, metal oxide, carbon filler, curative, and latex flouroelastomer. Aramid fiber may be in a range of 5–35%. Mineral filler may be in a range of 10–50%. Metal oxide may be in a range of 10–20%. The metal oxide may be any metal oxide that will react as an acid acceptor and curing component, such as Zinc oxide or magnesium oxide. Carbon filler may be in a range of 10–60%. Curative may be provided in an amount sufficient to reduce scorching. Specifically, curative may be in a range of approximately 1–5%. Latex flouroelastomer may be in a range of 20–50%. The percentage ranges are by weight based on the weight of the heel stock. Although the ingredients may be in the ranges as disclosed above, it is particularly advantageous to have the ingredients in the following range: Aramid fiber may be in a range of 8–10%. Metal oxide may be in a range of 6–8%. Carbon filler may be in a range of 15–20%. Curative may be in a range of 1–2%. Latex flouroelastomer may be in a range of 29–31%. Mineral filler may be in a range of 24–28%. The percentage ranges are by weight based on the weight of the heel stock. As will be understood by those skilled in the art, the disclosed ingredients and ranges are for purposes of illustration, not limitation. The invention encompasses modification of the given ingredients and ranges.

Another embodiment, for purposes of illustration and not limitation, of a latex elastomer based heel as disclosed in 17, FIG. 3 and 23, FIG. 5 comprises of aramid fiber, metal oxide, mineral fiber, mineral filler, glass fiber, carbon filler, curative accelerator, curative, anti-oxidant, latex nitrile elastomer, and polyester fiber. Aramid fiber may be in a range of 10–40%. Mineral fiber may be in a range of 2–10%. Mineral filler may be in a range of 20–40%. Glass fiber may be in a range of 5–20%. Carbon filler may be in a range of 2–10%. Metal oxide may be in a range of 2–10%. The metal oxide may be any metal oxide that will react as an acid acceptor and curing component, such as Zinc oxide or magnesium oxide. Accelerator curative may be in a range of 1–5%. Curative may be provided in an amount sufficient to reduce scorching. Specifically, curative may be in a range of approximately 1–5%. Anti-oxidant may be in a range of 1–5%. Latex Nitrile elastomer may be in a range of 10–40%. Polyester fiber may be in a range of 1–5%. The percentage ranges are by weight based on the weight of the heel stock. Although it is possible to make the compound with the ranges disclosed above, it is particularly advantageous if the ingredients are in the following range: Aramid fiber may be in a range of 18–21%. Mineral fiber may be in a range of 3–5%. Mineral filler may be in a range of 30–35%. Glass fiber may be in a range of 9–11%. Carbon filler may be in a range of 2–4%. Metal oxide may be in a range of 2–4%. Accelerator curative may be in a range of 0.5–1%. Curative may be in a range of 1–3%. Anti-oxidant may be in a range of 0.3–1%. Latex nitrate elastomer may be in a range of 22–26%. Polyester fiber may be in a range of 0.5–1.5%. The percentage ranges are by weight based on the weight of the heel stock. As will be understood by those skilled in the art, the disclosed ingredients and ranges are for purposes of illustration, not limitation. The invention encompasses modification of the given ingredients and ranges.

The two disclosed embodiments of latex based compound are for purposes of illustration, not limitation. While the latex elastomer based oil seal of the present invention has been described using a flouroelastomer or nitrile elastomer, any other suitable latex elastomer may be used.

One embodiment, for purposes of illustration and not limitation, of the lip part of the oil seal as disclosed in 18 FIG. 3 and 24 FIG. 5 may be comprised of the following ingredients: Nitrile Butadiene binder known by trade name such as PARACRIL CLT, Chloroprene binder known by the trade name such as NEOPRENE W, activators such as zinc oxide or stearic acid, Anti-oxidant known by trade name such as AGERITE RESIN D, curatives known by trade names such as SULFUR A, TMTD and MBTS, carbon fillers known by trade names such as N-330, N-990, and GRAPHITE 4023, and plasticizers known by trade name such as NATROCEL 6102 A and P-25 mix. The ingredients may be in the following range: approximately 25–45% nitrile butadiene binder, approximately1–10% chloroprene binder, approximately 1–5% activator, approximately 1–5% anti-oxidant, approximately 38–52% carbon fillers, approximately 5–15% plasticizer, and approximately 1–5% curative. The percentage ranges are by weight based on the weight of the lip compound. As will be understood by those skilled in the art, the disclosed ingredients and ranges are for purposes of illustration, not limitation. The invention encompasses modification of the given ingredients and ranges.

Another embodiment, for purposes of illustration and not limitation, of the lip part of an oil seal may comprise of the following ingredients: flouroelastomer binder known by trade name such as VITON B401, metal oxide, calcium hydroxide, Polytetrafluoroethylene known by trade name such as MPB-1500 and TEFLON, Carbon fillers known by trade names such as N-990 CARBON BLACK, bisphenol such as VITON CURATIVE #20 and VITON CUTRATIVE #50, and lubricant known by trade name such as CARNAUBA WAX. The ingredients may be in the following range: approximately 30–70% flouroelastomer binder, approximately 1–10% metal oxide, approximately 2–10% calcium hydroxide, approximately 1–10% polytetraflouroethylene, approximately 15–30% carbon filler, approximately 1–8% bisphenol, and approximately 1–5% lubricant. Flouroelastomer binder may be in a range of 30–70%. Metal oxide may be in a range of 1–10%. $CA(OH)_2$ may be in a range of 2–10%. Polytetrafluoroethylene may be in a range of 1–10%. Carbon filler may be in a range of 15–30%. Bisphenol may be in a range of 1–8%. Lubricant may be in a range of 1–5%. The percentage ranges are by weight based on the weight of the lip compound. As will be understood by those skilled in the art, the disclosed ingredients and ranges are for purposes of illustration, not limitation. The invention encompasses modification of the given ingredients and ranges.

The two disclosed embodiments of the lip compound are for purposes of illustration, not limitation. While the lip compound has been described using the above ingredients, the invention encompasses latex elastomer based oil seals with a latex elastomer based heel being surrounded by any type of lip compound. The disclosed latex elastomer based oil seals with latex elastomer heel is suitable with any type of lip compound.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed:

1. A latex elastomer based compound comprising approximately 5–35% aramid fiber, approximately 10–20% metal oxide, approximately 10–50% carbon filler, approximately 1–5% curative, approximately 20–50% latex flouroelastomer, and approximately 10–50% mineral filler by weight.

2. The latex elastomer based compound of claim 1 wherein said aramid fiber is 8–10%, said metal oxide is 12–14%, said carbon filler is 15–20%, said curative is 1–2%, said latex flouroelastomer is 29–31% and said mineral filler is 24–28% by weight.

3. A latex elastomer based compound comprising approximately 10–40% aramid fiber, approximately 2–10% mineral fiber, approximately 20–40% mineral filler, approximately 5–20% glass fiber, approximately 2–10% carbon filler, approximately 2–10% metal oxide, approximately 1–5% curative accelerator, approximately 1–5% curative, approximately 1–5% antioxidant, approximately 10–40% latex nitrile elastomer, and approximately 1–5% polyester fiber by weight.

4. The latex elastomer based compound of claim 3 wherein said aramid fiber is 18–21%, said mineral fiber is 3–5%, said mineral filler is 30–35%, said glass fiber is 9–11%, said carbon filler is 2–4%, said metal oxide is 2–4%, said accelerator curative is 0.5–1%, said curative is 1–3%, said anti-oxidant is 0.3–1%, said latex nitrile elastomer is 22–26%, and said polyester fiber is 0.5–1.5% by weight.

5. A process of making an oil seal without volatile organic compounds using a latex elastomer based compound comprising:
   i Providing the ingredients of the latex elastomer based compound including approximately 5–35% aramid fiber, approximately 10–50% mineral filler, approximately 10–20% metal oxide, approximately 10–60% carbon filler, and approximately 20–50% latex flouroelastomer by weight based on the weight of a heel stock for said latex elastomer based compound to make heel part of said oil seal;
   ii Combining said ingredients for said latex elastomer based compound;
   iii Rinsing said latex elastomer based compound;
   iv Drying said latex elastomer based compound;
   v Milling said latex elastomer based compound;
   vi Providing sufficient amount of curative to said latex elastomer based compound to reduce scorching;
   vii Calendering said milled latex elastomer based compound;
   viii Rolling said calendered latex elastomer based compound;
   ix Preparing said latex elastomer based compound into suitable sizes for heelstock;
   x Providing ingredients for lip compound;
   xi Combining said ingredients for said lip compound;
   xii Preparing said lip compound; and
   xiii Joining lip and heel compound.

6. The process of making an oil seal of claim 5 wherein said curative may be provided when all the other said ingredients are provided.

7. The process of making an oil seal of claim 5 wherein said curative is approximately 1–5%.

8. The process of making an oil seal of claim 5 further comprising of reprocessing excess said latex elastomer based compound.

9. The process of making an oil seal of claim 5 further comprising of plying or extruding said latex elastomer based compound.

10. The process of making an oil seal of claim 5 wherein said aramid fiber is 8–10%, said metal oxide is 12–14%, said carbon filler is 15–20%, said curative is 1–2%, said latex flouroelastomer is 29–31%, and said mineral filler is 24–28% by weight based on the weight of the heel stock part of an oil seal.

11. The process of making an oil seal of claim 5 wherein said lip compound comprises approximately 25–45% nitrile butadiene binder, approximately 1–10% chloroprene binder, approximately 1–5% activator, approximately 1–5% antioxidant, approximately 38–52% carbon fillers, approximately 5–15% plasticizer, and approximately 1–5% curative by weight based on the weight of the lip compound.

12. The process of making an oil seal of claim 5 wherein said lip compound comprises approximately 30–70% flouroelastomer binder, approximately 1–10% metal oxide, approximately 2–10% calcium hydroxide, approximately 1–10% polytetraflouroethylene, approximately 15–30% carbon filler, approximately 1–8% bisphenol, and approximately 1–5% lubricant by weight based on the weight of the lip compound.

13. A process of making an oil seal without volatile organic compounds using a latex elastomer based compound comprising:
   i Providing the ingredients of the latex elastomer based compound including approximately 10–40% aramid fiber, approximately 2–10% mineral fiber, approximately 20–40% mineral filler, approximately 5–20% glass fiber, approximately 2–10% carbon filler, approximately 2–10% metal oxide, approximately 1–5% curative accelerator, approximately 1–5% antioxidant, approximately 10–40% latex nitrile elastomer, and approximately 1–5% polyester fiber by weight based on the weight of a heel stock for said latex elastomer based compound to make heel part of said oil seal;
   ii Combining said ingredients for latex elastomer based on a mixer;
   iii Rinsing said latex elastomer based compound;
   iv Drying said latex elastomer based compound;
   v Milling said latex elastomer based compound;
   vi Providing sufficient amount of curative to said latex elastomer based compound to reduce scorching;
   vii Calendering said milled latex elastomer based compound;
   viii Rolling said calendered latex elastomer based compound;

ix Preparing said latex elastomer based compound into suitable sizes for heelstock;

x Providing ingredients for lip compound;

xi Combining said ingredients for said lip compound;

xii Preparing said lip compound; and xiii Joining said lip and heel compound.

14. The process of making an oil seal of claim 13 wherein said curative may be provided when all the other said ingredients are provided.

15. The process of making an oil seal of claim 13 wherein said curative is approximately 1–5%.

16. The process of making an oil seal of claim 13 further comprising of reprocessing excess said latex elastomer based compound.

17. The process of making an oil seal of claim of 13 further comprising of plying or extruding said latex elastomer based compound.

18. The process of making an oil seal of claim 13 wherein said aramid fiber is 18–21%, said mineral fiber is 3–5%, said mineral filler is 30–35%, said glass fiber is 9–11%, said carbon filler is 2–4%, said metal oxide is 2–4%, said accelerator curative is 0.5–1%, said curative is 1–3%, said anti-oxidant is 0.3–1%, said latex nitrile elastomer is 22–26%, and said polyester fiber is 0.5–1.5% by weight based on the weight of the heel stock part of an oil seal.

19. The process of making an oil seal of claim 13 wherein said lip compound comprises approximately 25–45% nitrile butadiene binder, approximately 1–10% chloroprene binder, approximately 1–5% activator, approximately 1–5% anti-oxidant, approximately 38–52% carbon fillers, approximately 5–15% plasticizer, and approximately 1–5% curative by weight based on the weight of the lip compound.

20. The process of making an oil seal of claim 13 wherein said lip compound comprises approximately 30–70% flouroelastomer binder, approximately 1–10% metal oxide, approximately 2–10% calcium hydroxide, approximately 1–10% polytetraflouroethylene, approximately 15–30% carbon filler, approximately 1–8% bisphenol, and approximately 1–5% lubricant by weight based on the weight of the lip compound.

21. A latex elastomer based oil seal comprising of a lip and heel with said heel ingredients comprising approximately 5–35% aramid fiber, approximately 10–20% metal oxide, approximately 10–60% carbon filler, approximately 20–50% latex flouroelastomer and approximately 10–50% mineral filler by weight based on the weight of the heel and sufficient amount of curative to reduce scorching.

22. The latex elastomer based oil seal of claim 21 wherein said curative is approximately 1–5% by weight based on weight of heel.

23. The latex elastomer based oil seal of claim 21 wherein said aramid fiber is 8–10%, said metal oxide is 12–14%, said carbon filler is 15–20%, said curative is 1–2%, said latex flouroelastomer is 29–31%, and said mineral filler is 24–28% by weight based on the weight of the heel.

24. The latex elastomer based oil seal of claim 21 wherein said lip of oil seal comprises approximately 25–45% nitrile butadiene binder, approximately 1–10% chloroprene binder, approximately 1–5% activator, approximately 1–5% anti-oxidant, approximately 38–52% carbon fillers, approximately 5–15% plasticizer, and approximately 1–5% curative by weight based on the weight of the lip compound.

25. The latex elastomer based oil seal of claim 21 wherein said lip of oil seal comprises approximately 30–70% flouroelastomer binder, approximately 1–10% metal oxide, approximately 2–10% calcium hydroxide, approximately 1–10% polytetraflouroethylene, approximately 15–30% carbon filler, approximately 1–8% bisphenol, and approximately 1–5% lubricant by weight based on the weight of the lip compound.

26. A latex elastomer based oil seal comprising of a lip and heel with said heel ingredients comprising approximately 10–40% aramid fiber, approximately 2–10% mineral fiber, approximately 20–40% mineral filler, approximately 5–20% glass fiber, approximately 2–10% carbon filler, approximately 2–10% metal oxide, approximately 1–5% curative accelerator, approximately 1–5% anti-oxidant, approximately 10–40% latex nitrile elastomer, and approximately 1–5% polyester fiber by weight based on the weight of the heel and sufficient amount of curative to reduce scorching.

27. The latex elastomer based oil seal of claim 26 wherein said curative is approximately 1–5% by weight based on weight of heel.

28. The latex elastomer based oil seal of claim 26 wherein said aramid fiber is 18–21%, said mineral fiber is 3–5%, said mineral filler is 30–35%, said glass fiber is 9–11%, said carbon filler is 2–4%, said metal oxide is 2–4%, said accelerator curative is 0.5–1%, said curative is 1–3%, said anti-oxidant is 0.3–1%, said latex nitrile elastomer is 22–26%, and said polyester fiber is 0.5–1.5% by weight based on the weight of the heel stock.

29. The latex elastomer based oil seal of claim 26 wherein said lip of oil seal comprises approximately 25–45% nitrile butadiene binder, approximately 1–10% chloroprene binder, approximately 1–5% activator, approximately 1–5% anti-oxidant, approximately 38–52% carbon fillers, and approximately 5–15% plasticizer by weight based on the weight of the lip compound.

30. The latex elastomer based oil seal of claim 26 wherein said lip of oil seal comprises approximately 30–70% flouroelastomer binder, approximately 1–10% metal oxide, approximately 2–10% calcium hydroxide, approximately 1–10% polytetraflouroethylene, approximately 15–30% carbon filler, approximately 1–8% bisphenol, and approximately 1–5% lubricant by weight based on the weight of the lip compound.

31. A process of making latex elastomer based compound comprising:

i providing the ingredients of the latex elastomer based compound including approximately 5–35% aramid fiber, approximately 10–20% metal oxide, approximately 10–60% carbon filler, approximately 1–5% curative, approximately 20–50% latex flouroelastomer, and approximately 10–50% mineral filler by weight based on the weight of the heel stock.

ii Combining said ingredients;

iii rinsing said latex elastomer based compound;

iv drying said latex elastomer based compound;

v masticating said latex elastomer based compound; and vi calendering said latex elastomer based compound.

32. The process of making latex elastomer based compound of claim 31 wherein said aramid fiber is 8–10%, said metal oxide is 12–14%, said carbon filler is 15–20%, said curative is 1–2%, said latex flouroelastomer is 29–31%, and said mineral filler is 24–28% by weight based on the weight of the heel stock.

33. A process of making latex elastomer based compound comprising:

i providing the ingredients of the latex elastomer based compound including approximately 10–40% aramid fiber, approximately 2–10% mineral fiber, approximately 20–40% mineral filler, approximately 5–20% glass fiber, approximately 2–10% carbon filler, approximately 2–10% metal oxide, approximately 1–5% curative accelerator, approximately 1–5% curative, approximately 1–5% anti-oxidant, approximately 10–40% latex nitrile elastomer, and approximately 1–5% polyester fiber by weight based on the weight of the heel stock for said latex elastomer based compound;

ii combining said ingredients;

iii rinsing said latex elastomer based compound;

iv drying said latex elastomer based compound;

v masticating said latex elastomer based compound; and vi calendering said latex elastomer based compound.

34. The process of making latex elastomer based compound of claim 32 wherein said aramid fiber is 18–21%, said mineral fiber is 3–5%, said mineral filler is 30–35%, said glass fiber is 9–11%, said carbon filler is 2–4%, said metal oxide is 2–4%, said accelerator curative is 0.5–1%, said curative is 1–3%, said anti-oxidant is 0.3–1%, said latex nitrile elastomer is 22–26%, and said polyester fiber is 0.5–1.5% by weight based on the weight of the heel stock.

* * * * *